UNITED STATES PATENT OFFICE 2,401,885

COPOLYMERS OF BUTADIENE-1,3 AND N-DIALKYL ACRYLAMIDES

Waldo L. Semon, Silver Lake, Ohio, assignor to The B. F. Goodrich Company, New York, N. Y., a corporation of New York No Drawing. Original application October 21, 1941, Serial No. 415,934. Divided and this application April 5, 1945, Serial No. 586,832

4 Claims. (Cl. 260—84.5)

This invention relates to copolymers of butadiene-1,3 hydrocarbons and amides of alpha methylene carboxylic acids, more particularly to rubber-like copolymers prepared from mixtures of these materials in which the butadiene-1,3 hydrocarbons constitute at least 50% by weight.

According to this invention novel polymerization products ranging in properties from those of a plastic elastic rubbery material to those of a tough leathery resinous material are prepared by the polymerization of a mixture of monomeric materials including a butadiene-1,3 hydrocarbon, by which is meant butadiene-1,3 (or ordinary butadiene) and its homologs which enter into polymerization reactions in substantially the same manner such as isoprene, 2,3-dimethyl butadiene-1,3, piperylene and the like, and an amide of an alpha methylene carboxylic acid, by which is meant both unsubstituted and N-substituted amides of carboxylic acids containing a methylene group ($CH_2=$) attached to a carbon atom adjacent to a carbonamide group

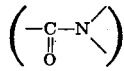

Amides of alpha methylene carboxylic acids ordinarily possess the general structural formula

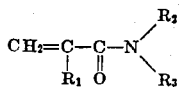

wherein $R_1$, $R_2$ and $R_3$ are hydrogen or hydrocarbon groups such as alkyl, aryl or aralkyl groups, but compounds wherein $R_1$ is a substituted hydrocarbon or halogen group such as chloroalkyl, alkoxyalkyl, chloroaryl, chloro, etc. are also included in this class. As examples of amides of alpha methylene carboxylic acids there may be mentioned the unsubstituted amides of acrylic and alpha-substituted acrylic acids such as acrylamide, alpha-methacrylamide, alpha-ethacrylamide, alpha-isopropacrylamide, alpha-butacrylamide, alpha-phenacrylamide, alpha-benzacrylamide, alpha-methoxy-methacrylamide, alpha-chloroacrylamide, and the like and also N-substituted amides of acrylic and alpha-substituted acrylic acids such as N-methyl acrylamide, N-ethyl acrylamide, N,N-diethyl acrylamide, N,N-dimethyl alpha-methacrylamide, N,N-dibutyl alpha-methacrylamide, N-phenyl acrylamide (methacrylanilide), N-benzyl methacrylamide, N-butyl alpha-butacrylamide, N,N-diethyl alpha-isopropacrylamide and the like.

Such amides may be prepared by reacting chlorides or esters of alpha methylene carboxylic acids with an appropriate amine. For example, N-diethyl acrylamide may be prepared by reacting acrylyl chloride with diethyl amine. Again if the methyl ester of an alpha methylene carboxylic acid is used as the starting material, the reaction proceeds as indicated by the following equation:

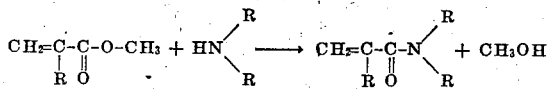

As mentioned hereinabove the present invention is concerned with the preparation of new and useful copolymers by the polymerization of a mixture containing one or more butadiene hydrocarbons and one or more alpha methylene amides. The most useful copolymers are those prepared from mixtures consisting of a butadiene-1,3 hydrocarbon, preferably butadiene-1,3, present in an amount equal to at least 50% by weight of the mixture, and an unsubstituted amide of an alpha methylene carboxylic acid or a similar N-hydrocarbon substituted amide wherein the substituent group contains no more than six carbon atoms, since such copolymers are elastic and vulcanizable with sulfur and, accordingly, are useful as rubber substitutes. Particularly valuable rubber-like copolymers are obtained when from 50 to 80% by weight of butadiene-1,3 is copolymerized with from 20 to 50% by weight of acrylamide, methacrylamide, N-diethyl acrylamide or the like.

Other valuable materials, however, may be obtained by polymerizing mixtures containing one or more butadiene-1,3 hydrocarbons and one or more alpha methylene amides present in other proportions by weight. For example copolymers prepared from mixtures containing over 50% by weight of the amide and less than 50% by weight of the butadiene-1,3 hydrocarbon are tough, resinous thermoplastic materials useful as leather substitutes and in other applications. It is to be understood, therefore, that this invention includes all copolymers of butadiene-1,3 hydrocarbons and alpha methylene amides regardless of the proportion of the individual monomers used to prepare the copolymers. Variations in properties of the copolymers of practical significance, however, are ordinarily obtained only when the proportion of the minor ingredient in the mixture to be polymerized is at least about 10% by weight. Hence, practically speaking, the copolymers of this invention will be prepared from mixtures containing from 10 to 90% by weight of a butadiene-1,3 and from about 10 to 90% by weight of an alpha methylene amide.

It is also within the scope of this invention to include one or more other polymerizable materials in the mixture of butadiene-1,3 hydrocarbons and alpha methylene amides to be polymerized. For example such materials as acrylic acid, methyl acrylate, methyl methacrylate, acrylonitrile, styrene, vinylidene chloride and the like may be included in relatively small proportions in mixtures also containing butadiene-1,3 hydrocarbons and alpha methylene amides, and such mixtures may be polymerized to form multicomponent copolymers of a variety of properties.

Polymerization of the monomeric mixtures described above is preferably effected in the form of an aqueous emulsion containing in addition to the polymerizable materials and water, an emulsifying agent, a polymerization initiator which causes the polymerization reaction to begin, and, if desired, a polymerization accelerator or catalyst which speeds up the reaction and a polymerization modifier which improves the quality of the polymerization products. However, other methods of polymerization such as by heating a homogenous mixture of the polymerizable materials either alone or in presence of a solvent and/or a catalyst or by exposing such a homogenous mixture to actinic radiation or to some other polymerizing influence may also be employed.

The nature of the copolymers and the preferred methods of conducting the polymerization may be better understood from the following specific examples which are intended to illustrate the invention but not to limit it in any respect. The parts are by weight.

Example 1

A mixture of 75 parts of butadiene-1,3 and 25 parts of acrylamide is emulsified with 250 parts of an aqueous solution containing 2% by weight of sodium palmitate as an emulsifying agent. A small amount (0.75 part) of diazoaminobenzene, a polymerization initiator, is then added and the emulsion is agitated at 40° C. for about four days. The resulting latex-like dispersion is coagulated whereupon a soft plastic and elastic polymer resembling unvulcanized natural rubber is obtained.

Example 2

A mixture of 75 parts of butadiene-1,3 and 25 parts of methacrylamide are polymerized as in Example 1. A polymer, similar to that obtained in Example 1, which is elastic and which may be milled and compounded in substantially the same manner as natural rubber is the product.

Example 3

A mixture of 65 parts of butadiene-1,3 and 35 parts of N-phenyl methacrylamide,

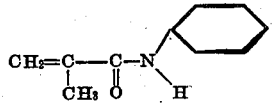

is polymerized in an aqueous emulsion containing 150 parts of a 5% aqueous solution of sodium lauryl sulfate as an emulsifying agent and .05 part of potassium persulfate as a polymerization initiator. A 90% yield of a strong, coherent, rubber-like material is obtained. When this polymer is sheeted on a two roll mixing mill and tested in a typical tire tread recipe, the vulcanizate exhibits an especially high tensile strength.

Example 4

A mixture of 70 parts of butadiene-1,3 and 30 parts of N,N-diethyl acrylamide,

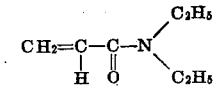

is polymerized while emulsified in about 250 parts of a 2% aqueous solution of myristic acid which has been 85% neutralized with sodium hydroxide, in the presence of 0.35 part of hydrogen peroxide, as an initiator, 0.75 part of sodium ferripyrophosphate, as a catalyst and 0.30 part of diisopropyl dixanthogen, as a modifier. The polymerization is complete after 72 hours at a temperature of 40° C. When the latex-like dispersion is coagulated a 90% yield of an excellent rubber-like copolymer is obtained. This copolymer is 40% soluble in benzene, is quite plastic and sheets well on the mill. Yet when the copolymer is compounded in a tire tread recipe and vulcanized, a vulcanized product having good physical properties is obtained. The vulcanizate also possesses oil resistance and is not deteriorated so rapidly by oxidation as is natural rubber or some other rubber-like copolymers. A copolymer prepared in an entirely similar manner from acrylonitrile instead of N-diethyl acrylamide is less plastic being only 14% soluble in benzene.

Although specific embodiments of the invention have been hereinabove disclosed it is to be understood that the invention is not limited solely thereto for it will be obvious to those skilled in the art that many modifications and variations in the nature and proportions of the specific compounds polymerized, in the method of conducting the polymerization and in the nature and proportions of added substances present during the polymerization such as emulsifying agents, initiators, catalysts, modifiers and the like, may be made without departing from the spirit and scope of the invention as defined by the appended claims.

This application is a division of my application Serial No. 415,934, filed October 21, 1941.

I claim:

1. The process which comprises polymerizing in aqueous emulsion a mixture of butadiene-1,3 and N-diethyl acrylamide, said mixture containing at least 50% by weight of butadiene-1,3.

2. The process which comprises polymerizing in aqueous emulsion a mixture of butadiene-1,3 and a N-dialkyl substituted amide of acrylic acid in which each alkyl group contains less than six carbon atoms, said mixture containing at least 50% by weight of butadiene-1,3.

3. A polymerization product obtained by the method of claim 1.

4. A polymerization product obtained by the method of claim 2.

WALDO L. SEMON.